United States Patent
Lee et al.

(10) Patent No.: US 9,568,306 B2
(45) Date of Patent: Feb. 14, 2017

(54) APPARATUS AND METHOD FOR SENSING HIGH PRECISION SIGNAL USING INFRARED LIGHT

(71) Applicant: Samsung Electronics Co., Ltd., Suwon-si (KR)

(72) Inventors: Hyong Euk Lee, Yongin-si (KR); Sang Hyun Kim, Hwaseong-si (KR); Won Chul Bang, Bundang-gu (KR); Jung Bae Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/944,729

(22) Filed: Nov. 18, 2015

(65) Prior Publication Data

US 2016/0069668 A1 Mar. 10, 2016

Related U.S. Application Data

(63) Continuation of application No. 13/280,825, filed on Oct. 25, 2011, now Pat. No. 9,207,778.

(30) Foreign Application Priority Data

Dec. 30, 2010 (KR) .......................... 10-2010-0138939

(51) Int. Cl.
| | |
|---|---|
| *G01B 11/14* | (2006.01) |
| *G01S 11/06* | (2006.01) |
| *G01S 3/783* | (2006.01) |
| *G01S 5/16* | (2006.01) |
| *G06F 3/03* | (2006.01) |
| *G01J 1/42* | (2006.01) |

(52) U.S. Cl.
CPC .............. *G01B 11/14* (2013.01); *G01J 1/4257* (2013.01); *G01S 3/783* (2013.01); *G01S 5/16* (2013.01); *G01S 11/06* (2013.01); *G06F 3/0304* (2013.01)

(58) Field of Classification Search
CPC ....... G01B 11/026; G01B 11/24; G01B 11/14; G01S 11/06; G01S 3/783; G01S 17/48
USPC ................... 250/559.1, 559.3; 356/614–622
See application file for complete search history.

(56) References Cited

U.S. PATENT DOCUMENTS

| | | | | |
|---|---|---|---|---|
| 4,479,717 A | * | 10/1984 | Cornillault | ........... G01B 11/026 250/227.11 |
| 5,552,883 A | * | 9/1996 | Busch-Vishniac | ..... G01B 11/26 356/139.03 |
| 6,946,956 B2 | * | 9/2005 | Hayashi | ................ F41G 3/2633 340/539.13 |

(Continued)

FOREIGN PATENT DOCUMENTS

| | | |
|---|---|---|
| JP | 2003-344012 A | 12/2003 |
| JP | 3123663 U | 7/2006 |

(Continued)

*Primary Examiner* — Kara E Geisel
*Assistant Examiner* — Maurice Smith
(74) *Attorney, Agent, or Firm* — NSIP Law

(57) ABSTRACT

A high precision signal sensing system and method using an infrared light is provided. The high precision signal sensing system may receive, from a light emitting device, a plurality of lights including a first light and a second light, may measure intensities of the first light and the second light, and may measure a light emitting intensity of the light emitting device based on an intensity difference between the measured light receiving intensities.

20 Claims, 11 Drawing Sheets

(56) References Cited

U.S. PATENT DOCUMENTS

2011/0278456 A1* 11/2011 Kiyose ................ G01B 11/14
250/338.1

FOREIGN PATENT DOCUMENTS

| JP | 4172307 B2 | 8/2008 |
| JP | 4238891 B2 | 1/2009 |
| JP | 2009-301564 A | 12/2009 |
| JP | 2010-121972 A | 6/2010 |
| JP | 2010-134611 A | 6/2010 |
| KR | 10-2003-0017039 A | 3/2003 |
| KR | 10-2009-0010356 A | 1/2009 |

* cited by examiner

DIRECTIONALITY 1

DIRECTIONALITY 2

APPARATUS AND METHOD FOR SENSING HIGH PRECISION SIGNAL USING INFRARED LIGHT

CROSS-REFERENCE TO RELATED APPLICATIONS

This application is a continuation of U.S. patent application Ser. No. 13/280,825, filed Oct. 25, 2011, which claims the priority benefit of Korean Patent Application No. 10-2010-0138939, filed on Dec. 30, 2010, in the Korean Intellectual Property Office, the disclosure of which is incorporated herein by reference.

BACKGROUND

1. Field

One or more example embodiments of the present disclosure relate to a method that may discretely transmit, using a transmitter, signals based on different directionalities or may discretely receive, using a receiver, signals based on different directionalities in different directions, and may measure a directional signal to be used for estimating a target object including the transmitter, selectively using at least one of intensities measured with respect to the received signals and an intensity difference between the intensities. For example, when the transmitted signal is light, example embodiments relate to a method that may precisely measure a light having a high signal-to-noise ratio (SNR) to be used for estimating a light emitting device, based on an intensity difference between a plurality of lights emitted from the light emitting device.

2. Description of the Related Art

Conventionally, technologies for estimating a three-dimensional (3D) location and direction of a mobile object or a target object have been utilized for sensing a motion of an object or a target object, such as, a human body, an animal, and the like, in a 3D space, using huge, expensive motion capturing equipment in various fields including graphics, animation industries, and the like.

One of the methods of estimating 3D location and direction is a method that uses infrared light. The method of estimating the 3D location and direction is limited to measuring an intensity of an infrared light signal received from a light emitting device and estimating, with a relatively low reliability, the 3D location and direction using the measured intensity of the infrared light signal.

Therefore there is a desire for a method of measuring a signal having a high signal-to-noise radio (SNR), to improve estimation of the 3D location and direction.

SUMMARY

One or more example embodiments of the present disclosure may include a high precision signal sensing system that may emit, using a light emitting device, a first light and a second light having different directionalities or may receive, with different directionalities, lights emitted from the light emitting device, may measure light receiving intensities of the first light and the second light, may selectively use measured light receiving intensities and an intensity difference between the measured intensities and thus, may precisely measure a signal having a high signal-to-noise ratio (SNR) as a signal to be used for estimating the light emitting device.

The foregoing and/or other aspects are achieved by providing a high precision signal sensing system, the system including a receiver to receive a signal from a transmitter, and a measuring device to measure an intensity with respect to a first signal and a second signal, the first signal and the second signal being classified based on a distance and a receiving direction, and to measure a directional signal to be used for estimating a target object including the transmitter, based on at least one of the measured intensities and an intensity difference between the intensities.

The foregoing and/or other aspects are achieved by providing a high precision signal sensing system, the system including a light receiving device to separately receive, as a first light and a second light, a light emitted from a light emitting device by changing a directionality or a light receiving direction, and a measuring device to measure a first light receiving intensity with respect to the first light and a second light receiving intensity with respect to the second light, and to measure a directional light to be used for estimating the light emitting device, based on an intensity difference between the first light receiving intensity and the second light receiving intensity.

The foregoing and/or other aspects are achieved by providing a method of sensing a high precision signal, the method including receiving, by a light receiving device, a light emitted from a light emitting device, measuring a light receiving intensity with respect to a first light and a second light, the first light and the second light being classified based on a distance and a light receiving direction, and measuring a directional light to be used for measuring the light emitting device, based on at least one of the measured light receiving intensities and an intensity difference between the measured light receiving intensities.

In addition, a non-transitory computer-readable storage medium encoded with computer readable code comprising a program for implementing the method of sensing a high precision signal.

The foregoing and/or other aspects are achieved by providing a high precision signal sensing system that includes a receiver made up of a plurality of light receiving units having different directionalities and receiving a first light signal and a second light signal from a transmitter and a measuring device. The measuring device measures an intensity with respect to the first light signal and the second light signal, the first light signal and the second light signal being classified based on at least one of a distance from the transmitter and a receiving direction, and to measure a directional signal to be used for estimating a target object based on at least one of the measured intensities of the first light signal and the second light signal and an intensity difference between the intensities.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
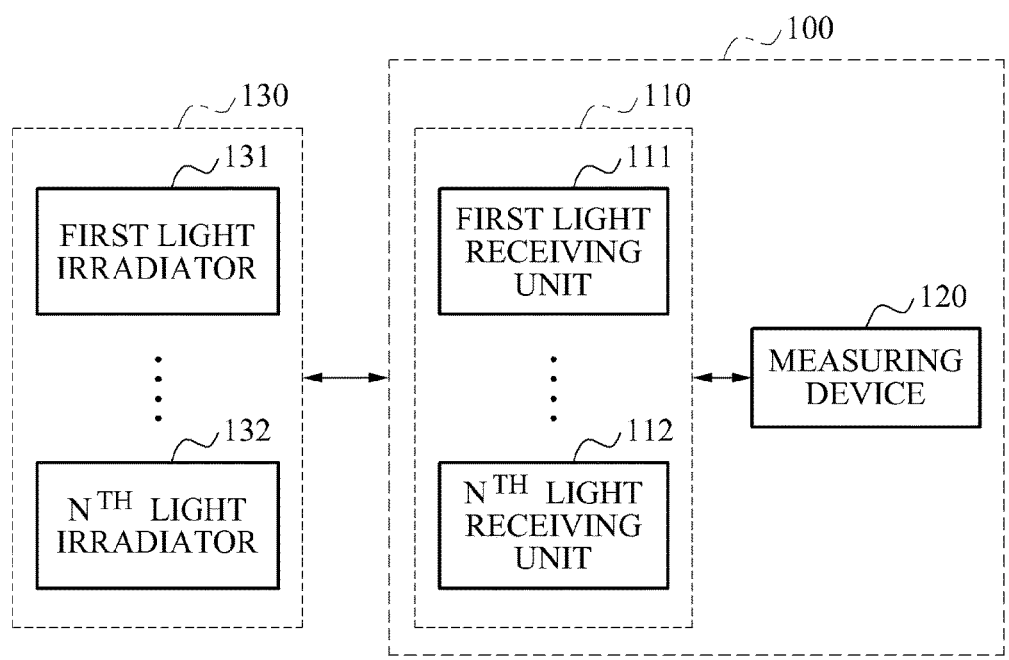
FIG. 1 illustrates a high precision signal sensing system.

Reference will now be made in detail to embodiments, examples of which are illustrated in the accompanying drawings, wherein like reference numerals refer to the like elements throughout. Embodiments are described below to explain the present disclosure by referring to the figures.

A transmitter may be a device for transmitting a signal, and, in embodiments, the transmitter may include at least one light irradiator that emits a signal in a form of light based on different directionalities.

A receiver may be a device for receiving a signal transmitted from the transmitter, and, in embodiments, the receiver may include at least one light receiving unit that receives a signal in the form of light based on different directionalities or may include at least one light receiving unit that receives, based on the same directionality, the signal in the form of light in different reception directions.

In embodiments, one of or both the transmitter and the receiver may transmit and receive signals based on different directionalities or in different directions and thus, a purpose of measuring a signal having a high signal-to-noise radio (SNR) may be obtained.

In embodiments, the light receiving unit may be included in a light receiving device including a light sensing function, and the light irradiator may be included in a target object of which a location and a direction is to be estimated.

The receiver, that is, one of the elements included in a high precision signal sensing system, may perform a function of receiving signals from the transmitter. The signals may be order-classified as a first signal and a second signal based on a distance from the transmitter or a reception direction. Depending on embodiments, signals transmitted from a plurality of transmitters may be order-classified as the first signal and the second signal.

The transmitter may enable respective signals transmitted from the transmitter to have different directionalities, and may separately transmit the signals as the first signal and the second signal based on various schemes, such as a time-division scheme that independently transmits each signal at a predetermined time, a coding scheme, such as a modulation, a scheme that transmits respective signals using different optical wavelengths, and the like. The high precision signal sensing system may include at least one transmitter.

The receiver may receive the first signal and second signal having different directionalities and thus, may enable a measuring device to precisely measure a directional signal based on intensities of respective signals, an intensity difference, and the like.

The high precision signal sensing system may include at least one receiver. When a single receiver is included in the system, the receiver may receive the first signal and the second signal by changing a reception direction.

When a plurality of receivers is included in the system, the receivers may receive the first signal and the second signal based on different directionalities, respectively, or the receivers arranged to have the same directionality may receive, in different reception directions, the first signal and the second signal, respectively.

The high precision signal sensing system may receive signals having different directions from the target object and thus, may provide an environment that selectively uses a signal having a relatively high SNR when a location and a direction of the target object is estimated.

The measuring device may measure an intensity with respect to the first signal and the second signal, the first signal and the second signal being classified based on a distance from the transmitter and a reception direction, and may measure a directional signal to be used for estimating the target object including the transmitter, based on at least one of the measured intensities and an intensity difference between the measured intensities.

The measuring device may measure a signal corresponding to the intensity difference as the directional signal, in a directionality where a first intensity measured with respect to the first signal or a second intensity measured with respect to the second signal is less than the intensity difference.

In an area of a directionality where respective intensities of the signals are less than a predetermined threshold, a signal corresponding to an intensity difference between the signals, as opposed to the respective signals, may be measured as a signal to be used for estimating the target object.

Conversely, in a directionality where the first intensity or the second intensity is greater than or equal to the intensity difference, the measuring device may measure a signal corresponding to the first intensity or the second intensity, as the directional signal.

In an area of a directionality where respective intensities of the signals are greater than the intensity difference between the signals, a signal having a high resolving power may be selectively measured as a signal to be used for estimating the target object. In this example, a signal of which an intensity rapidly decreases as a directionality increases may be determined as the signal having the high resolution.

For example, in an area of a directionality where the first intensity or the second intensity is greater than the intensity difference, that is, in a directionality of less than or equal to 1 radian, the measuring device may select a signal having a high resolving power among the first intensity and the second intensity, that is, a signal of which an intensity rapidly decreases as a directionality increases.

Conversely, in an area of a directionality where the first intensity or the second intensity is less than the intensity difference, the measuring device may measure a signal corresponding to the intensity difference as a directional signal in the area of the directionality.

One or more example embodiments will be described with reference to an example that transmits signals in a form of light.

FIG. 1 illustrates a high precision signal sensing system 100.

Referring to FIG. 1, the high precision signal sensing system 100 may include, for example, a light receiving device 110 and a measuring device 120.

The light receiving device 110 may receive, from a light emitting device 130, a plurality of lights including a first light and a second light. In this example, the light emitting device 130 may include at least one light irradiator, for example, a first light irradiator 131, up to an $n^{th}$ light irradiator 132. The light receiving device 110 may also include at least one light receiving unit, for example, a first light receiving unit 111, up to an $n^{th}$ light receiving unit 112. The light irradiator may be, for example, a light emitting diode (LED), and may emit an infrared light signal. The light receiving unit may be, for example, a photodiode, and may sense the emitted infrared light signal.

When a number of light receiving units included in the light receiving device 110 is relatively smaller than a number of light irradiators included in the light emitting device 130, for example, when the number of light irradiators is two and the number of light receiving units is one, the light receiving device 110 may receive, using the single light receiving unit, a first light and a second light emitted from the respective light irradiators.

In this example, the respective light irradiator in the light emitting device 130 may be arranged in the same direction and may form fields having different directionalities. When the respective light irradiators are arranged in the same direction, the light emitting device 130 may emit a plurality of lights in the same direction, and, since the respective light irradiators form fields having different directionalities, the light emitting device 130 may emit the plurality of lights having different intensities. The light emitting device 130 may separately emit lights, as a first light and a second light, based on a time division scheme, a coding scheme, an optical wavelength, and the like.

When the number of light receiving units included in the light receiving device 110 is greater than the number of the light irradiators included in the light emitting device 130, for example, when the number of light irradiators is one and the number of light receiving units is two, the light emitting device 110 may use the two light receiving units and respectively receive a first light and a second light emitted from the single light irradiator.

In this example, the light receiving units included in the light receiving device 110 may be arranged in the same direction and may form fields having different directionalities. The light receiving device 110 may arrange the light receiving units in the same direction to receive a plurality of lights in the same direction, and, since the respective receiving units form fields having different directionalities, the light receiving device 110 may receive the plurality of lights having different intensities.

For another example, the light receiving units included in the light receiving device 110 may be arranged in different directions and may form fields having the same directionality. Even through the respective light receiving units form fields having the same directionality, the light receiving device 110 may receive a plurality of lights having different intensities, since the respective light receiving units are arranged in different directions.

When the plurality of lights are received, the measuring device 120 may measure a light receiving intensity with respect to the first light and the second light, the first light and the second light being classified based on a distance from the transmitter 130 and a reception direction, and may measure, based on an intensity difference between the light receiving intensities, a directional light to be used for estimating the light emitting device 130 corresponding to a target object.

For example, the measuring device 120 may measure a light corresponding to the intensity difference between the first light receiving intensity and the second light receiving intensity, as the directional light of the light emitting device 130, in an area of a directionality where a first light receiving intensity measured with respect to the first light or a second light receiving intensity measured with respect to the second light is less than the intensity difference. In this example, the light corresponding to the intensity difference may have a high SNR since noise included in the first light may offset noise included in the second light. Therefore, the measuring device 120 may measure the directional signal based on the light that corresponds to the intensity difference and that has the high SNR and thus, may provide an environment that may precisely estimate the target object using a light maintaining a signal intensity of a predetermined level.

Conversely, in an area of a directionality where the first light receiving intensity measured with respect to the first light or the second light receiving intensity measured with respect to the second light is greater than or equal to the intensity difference between the first light receiving intensity and the second light receiving intensity, the measuring device 120 may measure a light corresponding to the first light receiving intensity or the second light receiving intensity, as the directional signal. For example, the measuring device 120 may select, from among the first light receiving intensity and the second light receiving intensity, an intensity that has a high resolution, that is, an intensity that rapidly decreases as a directionality increases, and may measure a light corresponding to the selected intensity may be measured as the directional signal to be used for estimating the light emitting device 130.

When the light irradiators included in the light emitting device 130 are arranged in the same direction and form fields having different directionalities, the measuring device 120 may measure a plurality of light receiving intensities based on reception directions or emitting directions and distances between the light receiving units and the respective light irradiators, under a condition that the formed fields have intersected with fields associated with respective light receiving units included in the light receiving device 110.

For another example, when the light receiving units included in the light receiving device 110 are arranged in the same direction and may form fields having different directionalities or when the light receiving units included in the light receiving device 110 are arranged in different directions and may form fields having the same directionality, the measuring device 120 may measure a plurality of light receiving intensities, based on reception directions or emitting directions and distances between the light receiving units and the respective light irradiators, under a condition that the formed fields intersect fields associated with respective light irradiators included in the light emitting device 130.

The measuring device 120 may measure the directional signal to be used for estimating the light emitting device 130 based on a light receiving directionality of the light receiving device 110 and a light emitting directionality of the light emitting device 130, in addition to an intensity difference between light receiving intensities associated with respective emitted lights. In this example, the light receiving directionality may be a property that changes a light receiving intensity based on a directionality of a light receiving unit that receives an emitted light, and the light emitting directionality may be a property that changes a light receiving intensity based on a directionality of a light irradiator that emits a light.

Figure 2:
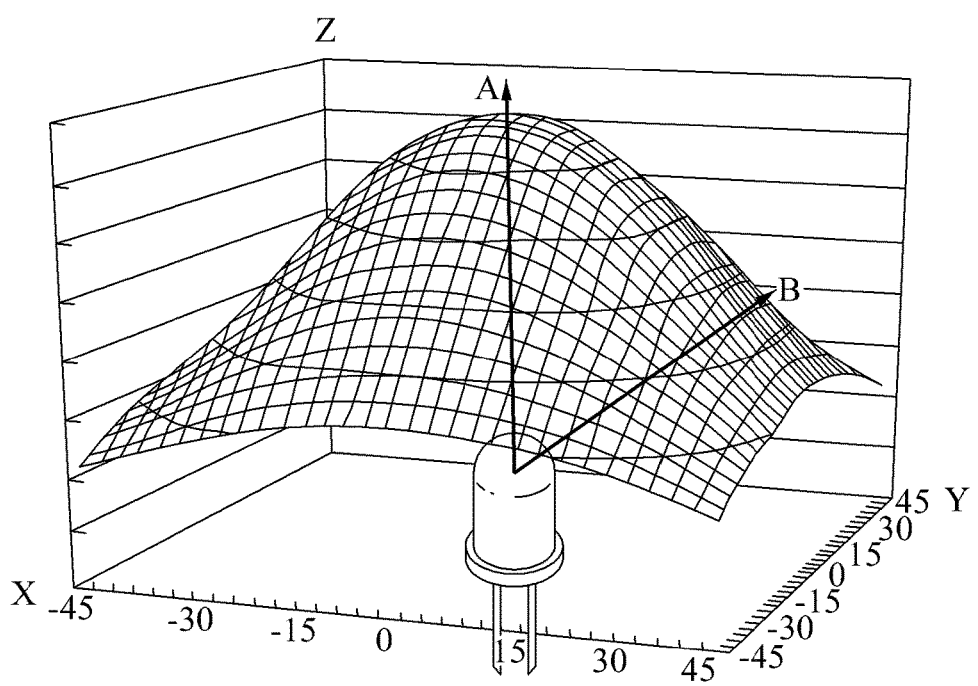
FIG. 2 illustrates a light emitting directionality of an infrared light signal of which a light receiving intensity varies based on the light emitting directionality of the infrared light signal.

FIG. 2 illustrates a light emitting directionality of an infrared light signal of which a light receiving intensity varies based on a light emitting direction of the infrared light signal.

Referring to FIG. 2, a light receiving intensity of the infrared light signal may vary based on a direction angle of a light irradiator, that is, based on a directionality of the infrared light signal at a predetermined distance. Referring to FIG. 2, an x-axis and a y-axis may denote measuring angles at which a light receiving unit measures the light irradiator, and a z-axis may denote an intensity of the emitted infrared light signal.

Figure 3:
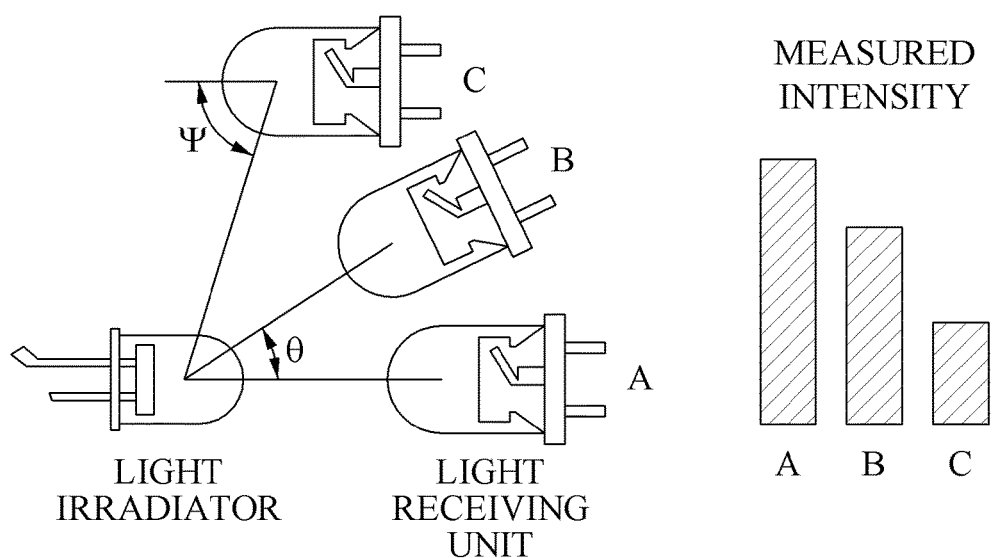
FIG. 3 illustrates a light emitting directionality and a light receiving directionality of an infrared light signal.

FIG. 3 illustrates a light emitting directionality and a light receiving directionality of an infrared light signal.

Referring to FIG. 3, comparison between light receiving intensities of A and B may show that a light receiving intensity of an infrared light signal varies based on a light emitting direction angle θ of a light irradiator. The light receiving intensity of the infrared light signal may be affected by a light receiving direction angle ψ that corresponds to a direction where a light receiving unit receives the infrared light signal.

An intensity of a signal measured based on a distance between the light irradiator and the light receiving unit may satisfy Equation 1.

$$I \propto \frac{1}{r^2} \quad \text{[Equation 1]}$$

In Equation 1, I may denote the measured intensity of the signal, and r may denote the distance between the light irradiator and the light receiving unit.

An intensity of a signal measured based on a directionality of the light irradiator may satisfy Equation 2.

$$I \propto \cos(\kappa\theta) \quad \text{[Equation 2]}$$

In Equation 2, I may denote the measured intensity of the signal, k may denote a parameter indicating an attenuation property of the light irradiator, and a direction angle of the irradiator.

An intensity of a signal measured based on a directionality of the light receiving unit may satisfies Equation 3.

$$I \propto \cos(\lambda\psi) \quad \text{[Equation 3]}$$

In Equation 3, I may denote the measured intensity of the signal, λ may denote a parameter indicating an attenuation property of the light receiving unit, and ψ may denote a direction angle of the light receiving unit.

An intensity of a signal measured based on the distance between the light irradiator and the light receiving unit, the directionality of the light irradiator, and the directionality of the light receiving unit, may be expressed as Equation 4.

$$I = \alpha\cos(\kappa\theta) \cdot \frac{1}{r^2} \cdot \cos(\lambda\psi) \quad \text{[Equation 4]}$$

In Equation 4, I may denote the measured intensity of the signal, r may denote the distance between the light irradiator and the light receiving unit, α may denote a scale factor that is based on properties of the light irradiator and the light receiving units, k may denote the parameter indicating an attenuation property of the light irradiator, θ may denote the direction angle of the light irradiator, λ may denote the parameter indicating the attenuation property of the light receiving unit, and ψ may denote the direction angle of the light receiving unit.

Figure 4:
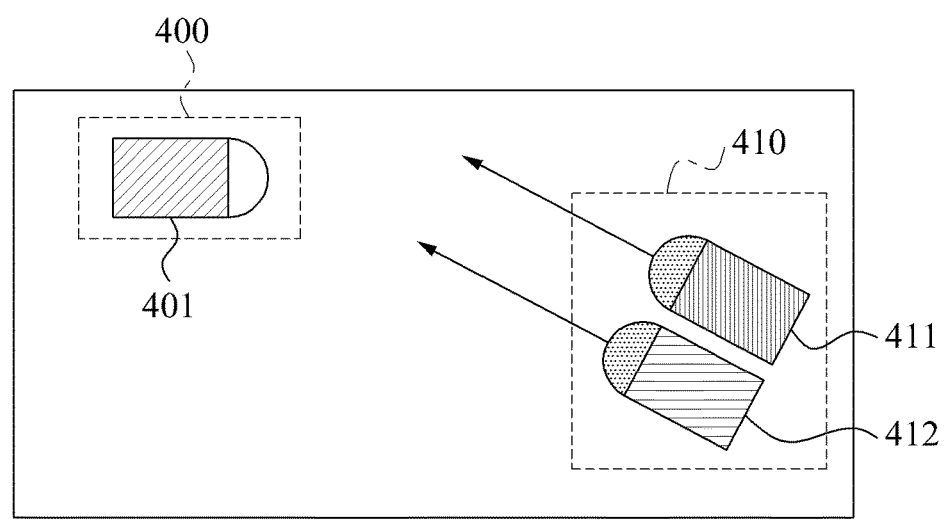
FIG. 4 illustrates an example of a high precision signal sensing system.
Figure 4:
Figure 4:

FIG. 4 illustrates an example of a high precision signal sensing system 400.

Referring to FIG. 4, the high precision signal sensing system 400 may receive, using a single light receiving device 401, two lights emitted from two light irradiators 411 and 412 that are arranged in the same direction in a light emitting device 410. In this example, two light irradiators 411 and 412 may form fields having different directionalities and may emit two lights having different intensities. Accordingly, the high precision signal sensing system 400 may receive two lights having different intensities.

The high precision signal sensing system 400 may measure, using the two lights having different light receiving intensities, a directional signal to be used for estimating the light emitting device 410. In an area of a directionality where a first light receiving intensity measured with respect to a first light or a second light receiving intensity measured with respect to a second light is greater than or equal to an intensity difference between the first light receiving intensity and the second light receiving intensity, the high precision signal sensing system 400 may measure a light corresponding to the first light receiving intensity or the second light receiving intensity as a directional signal in the corresponding area. In this example, the high precision signal sensing system 400 may select an intensity of a light emitted from a light irradiator having a relatively high resolution from among the first light receiving intensity and the second light receiving intensity and thus, may selectively measure an emitted light of which a light receiving intensity sensitively varies based on a change in a directionality.

Conversely, in an area of a directionality where the first light receiving intensity or the second light receiving intensity is less than the intensity difference, the high precision signal sensing system 400 may measure a light corresponding to the intensity difference as a directional signal in the corresponding area.

Figure 5:
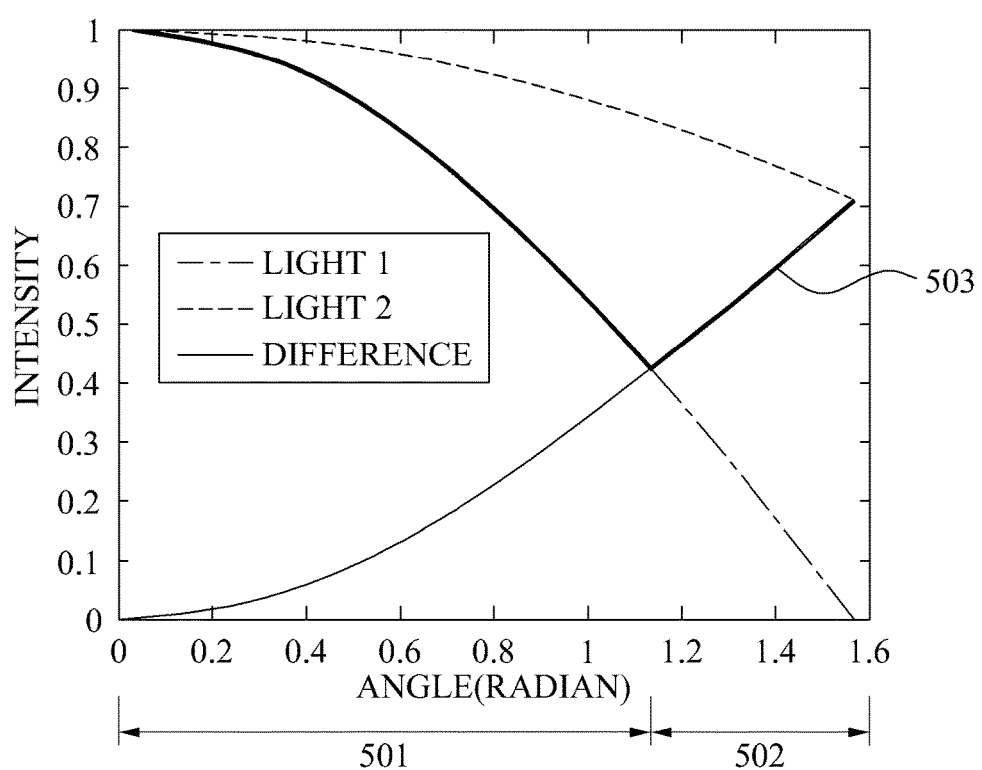
FIG. 5 illustrates an example of a light receiving intensity with respect to a directional light of a light receiving unit.

FIG. 5 illustrates an example of a light receiving intensity with respect to a directional light of a light receiving unit.

Referring to FIG. 5, in an area 501 of a directionality where a first light receiving intensity measured with respect to a first light or a second light receiving intensity measured with respect to a second light is greater than or equal to an intensity difference between the first light receiving intensity and the second light receiving intensity, a high precision signal sensing system may measure a light corresponding to the first light receiving intensity of a light irradiator having a relatively high resolution.

In an area 502, of a directionality where the first light receiving intensity or the second light receiving intensity is less than the intensity difference, the high precision signal sensing system may selectively measure a light corresponding to the intensity difference.

Accordingly, since noise is offset, the high precision signal sensing system may use a signal of which an SNR is at least a predetermined level and thus, may provide an environment that precisely estimates a distance and a direction of the light emitting device, that is, a target object.

Figure 6A:
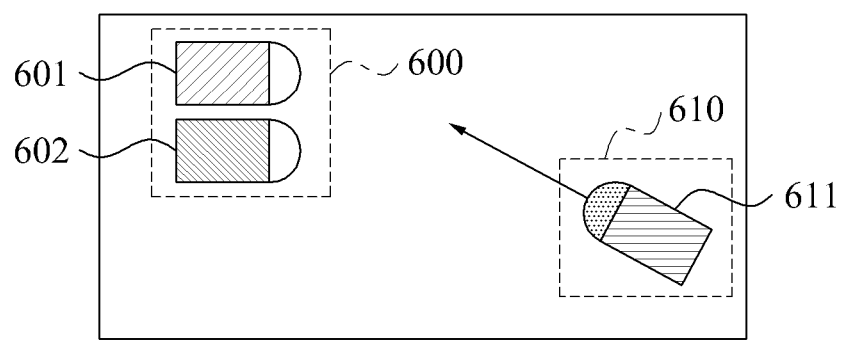
FIGS. 6A through 6C illustrate other examples of a high precision signal sensing system.
Figure 6B:
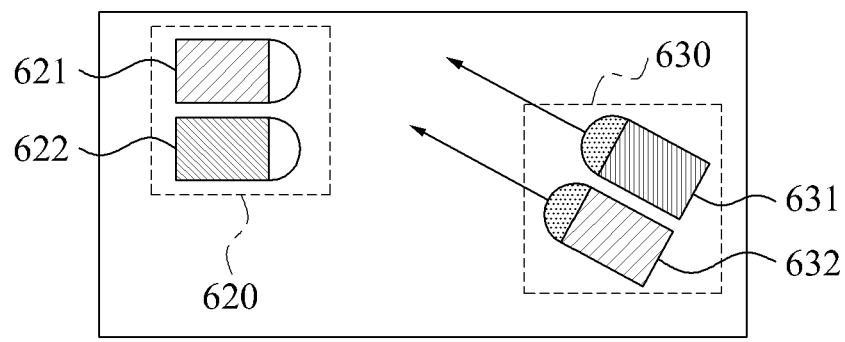
Figure 6C:
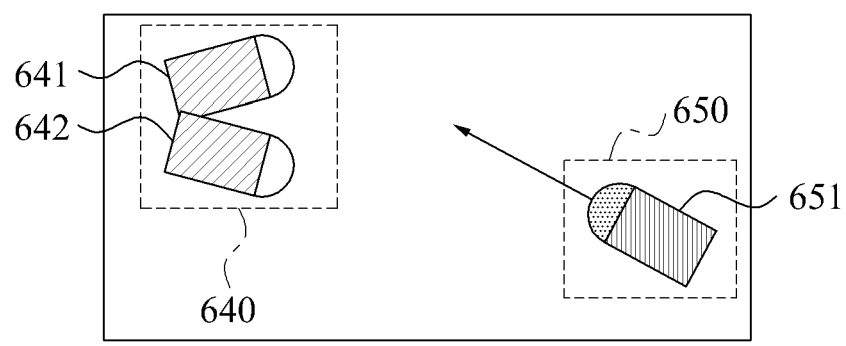

FIGS. 6A through 6C illustrate other examples of a high precision signal sensing system.

Referring to FIG. 6A, a high precision signal sensing system 600 may receive, using two light receiving units 601 and 602, two lights emitted from a single light irradiator 611 included in a light emitting device 610. The two light receiving units 601 and 602 may be arranged in the same direction and may have different directionalities. In this example, the two receiving units 601 and 602 may form fields having different directionalities and may separately receive two lights having different intensities. In this example, the two lights having different intensities may be separately transmitted, based on a time division scheme, a modulation scheme, an optical wavelength, and the like, respectively.

Referring to FIG. 6B, a high precision signal sensing system 620 may receive, using two light receiving units 621 and 622, two lights emitted from two light irradiators 631 and 632 arranged in the same direction in the light emitting device 630. The two light receiving units 621 and 622 may be arranged in the same direction and may have different directionalities. In this example, two light irradiators 631 and 632 may form fields having different directionalities, and may emit two lights having different intensities. The two light receiving units 621 and 622 may form fields having different directionalities and may receive two lights having different intensities, respectively.

Referring to FIG. 6C, a high precision signal sensing system 640 may receive, using two light receiving units 641 and 642, two lights from a single light irradiator 651 included in the light emitting device 650. The two light receiving units 641 and 642 may have the same directionality and may be arranged in different directions. Even though the two light receiving units 641 and 642 form fields having the same directionality, the two light receiving units 641 and 642 may receive two lights having different intensities, respectively, since the two light receiving units 641 and 642 are arranged in different directions.

A high precision signal sensing system may be variously configured, and may measure a signal having a reliable SNR of at least a predetermined level using different light receiving intensities with respect to an emitted light and thus, may precisely estimate a light emitting device.

Figure 7:
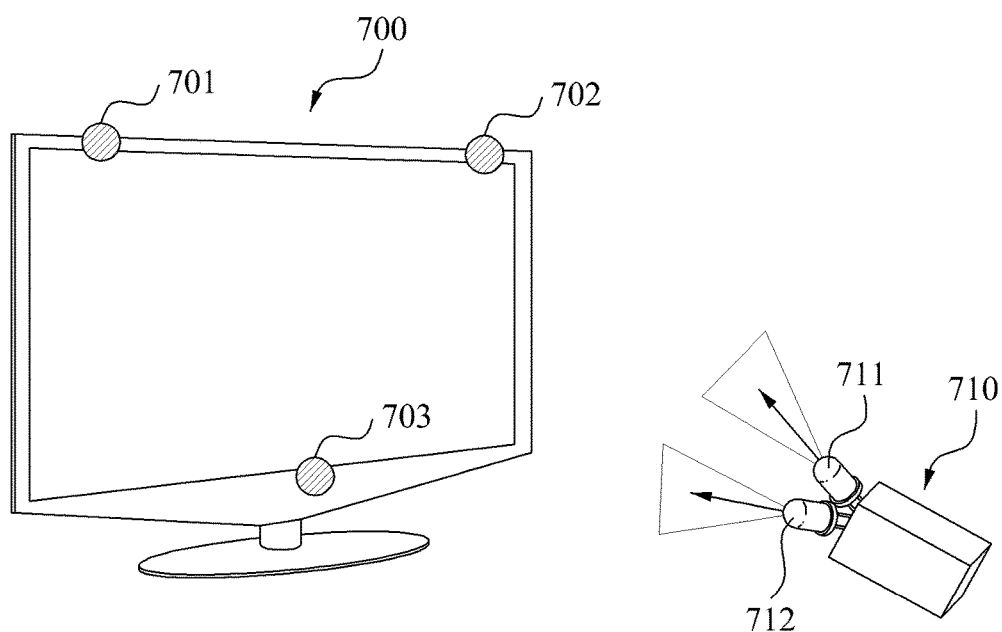
FIG. 7 illustrates a system that estimates a location and a direction using a high precision signal sensing system.

FIG. 7 illustrates a system that estimates a location and a direction using a high precision signal sensing system. In this example, a location and direction estimating system 700 that estimates a location and a direction may include the high precision signal sensing system.

Referring to FIG. 7, the location and direction estimating system 700 may estimate a location (x, y, z) and a direction (ϕ, θ, ψ) of a light emitting device, based on an intensity varying based on a distance or a light receiving direction with respect to a light received by a light receiving unit, for example, light receiving units 701, 702, and 703, and based on a light receiving directionality and a light emitting directionality. A location and direction estimating method of the location and direction estimating system 700 will be described with reference to FIG. 8.

Figure 8:
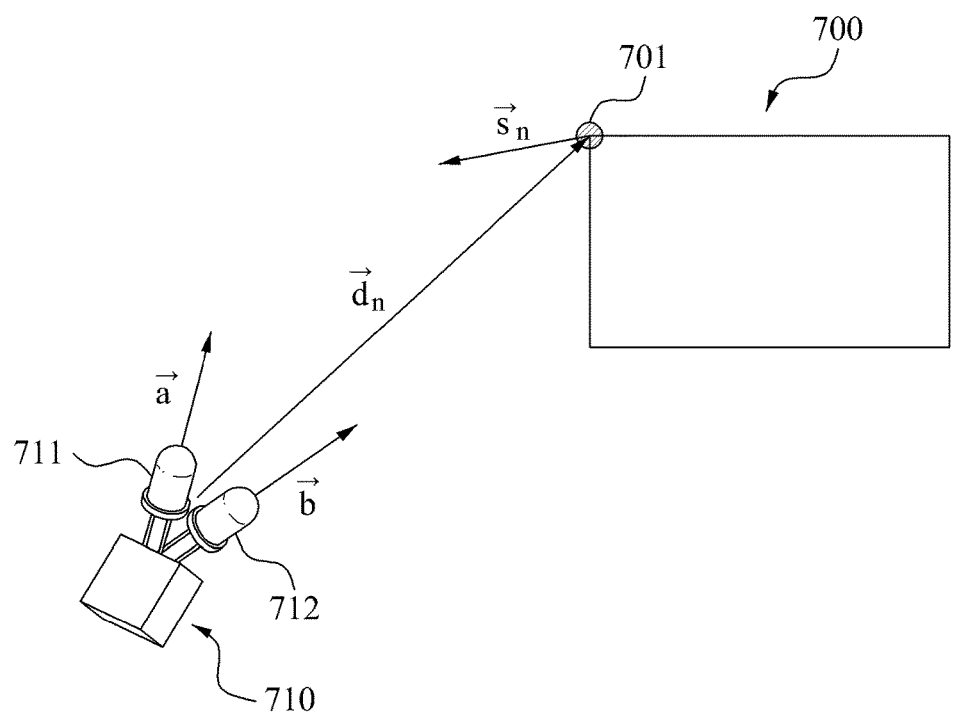
FIG. 8 illustrates a parameter to be used for calculation that estimates a three-dimensional (3D) location and direction, when two light irradiators are utilized.

FIG. 8 illustrates a parameter that may be used for a calculation that estimates a three-dimensional (3D) location and direction, when two light irradiators are utilized.

Referring to FIG. 8, unit direction vectors directed by the light irradiators 711 and 712 and the light receiving unit 701 may be defined, with respect to a global coordinate system, as $\vec{a}=(x_a, y_a, z_a)$, $\vec{b}=(x_b, y_b, z_b)$, $\vec{s}_n=(x_{sn}, y_{sn}, z_{sn})$, respectively. A direction vector indicating a displacement from light irradiators 711 and 712 to the light receiving unit 701 may be defined as $\vec{d}_n=(x_{dn}, y_{dn}, z_{dn})$.

An angle between $\vec{d}_n$ and each of $\vec{a}$ and $\vec{b}$ may be $\theta_{an}$ and $\theta_{bn}$, and, when λ=1 in Equation 4, an intensity of a light received by a light receiving unit, for example, the light receiving units 701, 702, and 703 may be expressed as Equation 5 and Equation 6.

$$I_{na} = \alpha \cos\left(\kappa \cos^{-1}\left(\frac{\vec{a} \cdot \vec{d}}{|\vec{d}|}\right)\right) \cdot \frac{1}{|\vec{d}|^2} \cdot \frac{-\vec{s}_n \cdot \vec{d}}{|\vec{d}|} \quad \text{[Equation 5]}$$

In Equation 5, $I_{na}$ may denote an intensity of a light emitted from the first light irradiator 711, which is received by an $n^{th}$ light receiving unit.

$$I_{nb} = \alpha \cos\left(\kappa \cos^{-1}\left(\frac{\vec{b} \cdot \vec{d}}{|\vec{d}|}\right)\right) \cdot \frac{1}{|\vec{d}|^2} \cdot \frac{-\vec{s}_n \cdot \vec{d}}{|\vec{d}|} \quad \text{[Equation 6]}$$

In Equation 6, $I_{nb}$ may denote an intensity of a light emitted from the second light irradiator 712, which is received by the $n^{th}$ light receiving unit.

When lights from the two light irradiators 711 and 712 are sequentially received within a short time or the lights are received based on different frequencies, information associated with Equation 5 and Equation 6 may be discretely obtained. Therefore, each of the light receiving units 701, 702, and 703 may obtain two equations.

When the three light receiving units 701, 702, and 703 are used, six equations may be obtained with respect to a location and a direction associated with the light emitting device 710.

When $\vec{a}$, $\vec{b}$, and $\vec{d}_n$ are obtained, the location and the direction may be calculated. Therefore, when nine unknown quantities corresponding to components of the direction vectors are obtained, the location and the direction may be calculated. In this example, $\vec{a}$ and $\vec{b}$ may be unit vectors and thus, may have a size of 1. A relative location relation between $\vec{a}$ and $\vec{b}$ may be given in advance and thus, three additional equations may be given.

Accordingly, the nine known quantities may be calculated from the nine equations based on an optimization scheme and the like. In this example, when a number of light receiving units increases, calculation may be based on a normalization that minimizes an error.

When the location and direction estimating system 700 includes two light irradiators 711 and 712, a location (x, y, z) and a direction (ϕ, θ, ψ) may vary based on the number of the light receiving units, as shown in Table 1. In this example, x, y, and z may denote a 3D coordinates, ϕ may be a roll based on a z axis, θ may denote a pitch based on an x axis, and ψ may denote a yaw based on a y axis.

TABLE 1

| Number of units | | Light emitting device | | | | | |
|---|---|---|---|---|---|---|---|
| | Light | Location | | | Direction | | |
| Light irradiator | receiving unit | x | y | z | ϕ | θ | ψ |
| 2 | 3 | ○ | ○ | ○ | ○ | ○ | ○ |
| 2 | 2 | ○ | ○ | x | x | ○ | ○ |

Referring to Table 1, when the location and direction estimating system 700 has two light irradiators 711 and 712 and three light receiving units 701, 702, and 703, the location and direction estimating system 700 may estimate a 3D location (x, y, z) and three axis directions, that is, roll (ϕ), pitch (θ), and yaw (ψ), associated with the light emitting device 710.

The estimation may be performed in the same manner, when the number of the light irradiators and the number of light receiving units are opposite to the above case. When the number of light irradiators is three and the number of light receiving units is two, the location and direction estimating system 700 may estimate the 3D location (x, y, z) and the three axis directions, that is, roll ($\phi$), pitch ($\theta$), and yaw ($\psi$), associated with the light emitting device 710.

Referring to Table 1, when the location and direction estimating system 700 includes two light irradiators and two light receiving units, and the roll ($\phi$) among the three axis directions of the light emitting device 710 is fixed, the location and direction estimating system 700 may estimate a location on a two-dimensional (2D) plane of the light emitting device 710 and directions, that is, pitch ($\theta$) and yaw ($\psi$), on the 2D plane of the light emitting device 710

Figure 9:
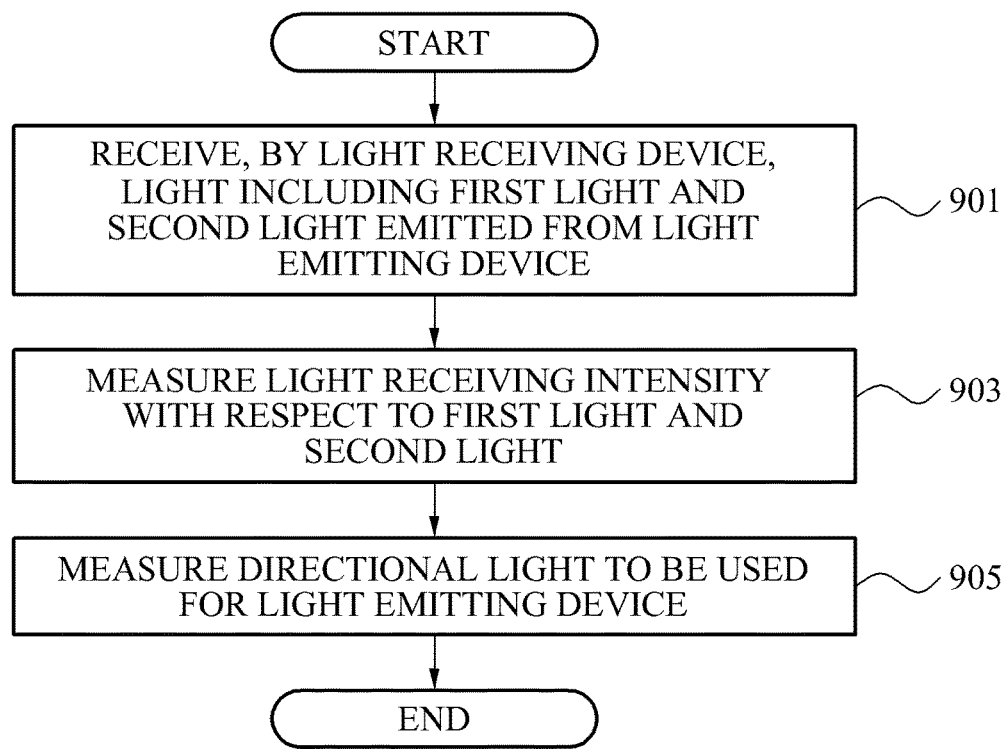
FIG. 9 is a flowchart illustrating a high precision signal sensing method.

FIG. 9 illustrates a high precision signal sensing method.

Referring to FIG. 9, in operation 901, a high precision signal sensing system may receive a light from a light emitting device. The high precision signal sensing system may discretely receive lights as a first light and a second light based on a distance between the light emitting device and the light receiving device, a light receiving direction, and the like.

The high precision signal sensing system may variously receive emitted lights.

For example, the high precision sensing system may receive, using a single light receiving unit, two lights having different intensities, which are emitted from two light irradiators having different directionalities.

The high precision sensing system may receive, using two light receiving units, two lights emitted from at least one light irradiator. The two light receiving units may be arranged in the same direction and may have different directionalities. The light receiving unit may receive two lights with different intensities because the intensities of the two lights grow to be different from each other due to the different directionalities.

The high precision signal sensing system may receive, using two light receiving units, two lights emitted from at least one light irradiator. The two light receiving units may be arranged in different directions and may have the same directionality. The light receiving units may receive, with different intensities, lights emitted from the light irradiator by changing reception directions.

In operation 903, the high precision signal sensing system may measure light receiving intensities of a first light and a second light, the first light and the second light being classified based on a distance and a light receiving direction.

In this example, the light receiving intensities with respect to the first light and the second light may be different from each other.

In operation 905, the high precision signal sensing system may measure a directional signal to be used for estimating the light emitting device, based on at least one of the measured light receiving intensities and an intensity difference between the light receiving intensities.

In a directionality where the first light receiving intensity or the second light receiving intensity is greater than or equal to the intensity difference, the high precision signal sensing system may measure a light corresponding to the first light receiving intensity or the second light receiving intensity as the directional signal to be used for estimating the light emitting device. For example, the high precision signal sensing system may measure a light associated with a light irradiator having a relatively high resolution, among lights corresponding to the first light receiving intensity and the second light receiving intensity.

In a directionality where the first light receiving intensity or the second light receiving intensity is less than the intensity difference, the high precision sensing system may selectively measure a light corresponding to the intensity difference. In this example, the light corresponding to the intensity difference may have a high SNR since noise included in the first light offsets noise included in the second light. Accordingly, the high precision signal sensing system may selectively measure a light having a high SNR based on a change in directionality.

In addition, the location and direction estimating system that utilizes the high precision signal sensing system may more precisely estimate the location or the direction associated with the light emitting device corresponding to a target object.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the high precision signal sensing system described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A high precision signal sensing system, the system comprising:
   a receiver to receive a first signal and a second signal emitted from a transmitter comprising a plurality of light irradiators having different directionalities or different emitting directions; and
   a processor to measure an intensity with respect to the first signal and the second signal and to estimate at least one of a location and direction of a target object comprising the transmitter based on at least one of the measured intensities of the first signal and the second signal and an intensity difference between the measured intensities, wherein the measured intensities of the first signal and the second signal depend on at least one of a receiving direction at the receiver, an emitting direction at the transmitter and a distance between the transmitter and the receiver.

2. The system of claim 1, wherein the processor estimates at least one of the location and the direction of the target object by measuring a directional signal based on at least one of the measured intensities and the intensity difference.

3. The system of claim 2, wherein, the processor measures, as the directional signal, a signal corresponding to the intensity difference in a directionality where a first intensity or a second intensity is less than the intensity difference, the first intensity being measured with respect to the first signal and the second intensity being measured with respect to the second signal.

4. The system of claim 2, wherein the processor measures, as the directional signal, a signal corresponding to a first intensity or a second intensity in a directionality where the first intensity or the second intensity is greater than or equal to the intensity difference, the first intensity being measured with respect to the first signal and the second intensity being measured with respect to the second signal.

5. The system of claim 1, wherein, when the transmitter is a light irradiator that transmits the first signal and the second signal based on different directionalities, in a form of light, the processor estimates at least one of the location and the direction of the target object based on a first light receiving intensity measured with respect to a first light corresponding to the first signal, a second light receiving intensity measured with respect to a second light corresponding to the second signal, and an intensity difference between the first light receiving intensity and the second light receiving intensity.

6. The system of claim 5, wherein the light irradiator separately emits the first light and the second light based on at least one of a time division scheme, a coding scheme, and an optical wavelength.

7. The system of claim 1, wherein, when the first signal and second signal are in a form of light,
the receiver receives, based on different directionalities, a first light corresponding to the first signal and a second light corresponding to the second signal, or receives, based on the same directionality, the first light and the second light in different receiving directions; and
the processor estimates at least one of the location and the direction of the target object based on at least one of a first light receiving intensity measured with respect to the first light, a second light receiving intensity measured with respect to the second light, and an intensity difference between the first light receiving intensity and the second light receiving intensity.

8. The system of claim 1, wherein the processor measures the intensity further based on a directionality associated with the receiver or a directionality associated with the transmitter.

9. A high precision signal sensing system, the system comprising:
a light receiving device comprised of a plurality of light receivers having different directionalities or different receiving directions to separately receive, as a first light and a second light, a light emitted from a light emitting device; and
a processor to measure a first light receiving intensity with respect to the first light and a second light receiving intensity with respect to the second light, and to estimate at least one of a location or direction of the light emitting device, based on at least one of the first light receiving intensity, the second light receiving intensity, and an intensity difference between the first light receiving intensity and the second light receiving intensity.

10. The system of claim 9, wherein the processor estimates at least one of the location and the direction of the light emitting device by measuring a directional light based on at least one of the first light receiving intensity, the second light receiving intensity, and the intensity difference.

11. The system of claim 10, wherein the processor performs:
measuring, as the directional light, a light corresponding to the intensity difference, when the first light receiving intensity or the second light receiving intensity is less than the intensity difference; and
measuring, as the directional light, a light corresponding to the first light receiving intensity or the second light receiving intensity, when the first light intensity or the second light intensity is greater than or equal to the intensity difference.

12. A method of sensing a high precision signal, the method comprising:
receiving a first signal and a second signal emitted from a transmitter comprising a plurality of light irradiators having different directionalities or different emitting directions;
measuring an intensity with respect to the first signal and the second signal; and
estimating at least one of a location or direction of the target object comprising transmitter based on at least one of the measured intensities of the first signal and the second signal and an intensity difference between the measured intensities,
wherein the measured intensities of the first signal and the second signal depend on at least one of a receiving direction at the receiver, an emitting direction at the transmitter and a distance between the transmitter and the receiver.

13. The method of claim 12, wherein the estimating of at least one of the location and the direction of the target object estimates at least one of the location and the direction of the target object by measuring a directional signal based on at least one of the measured intensities of the first signal and the second signal and the intensity difference.

14. The method of claim 13, wherein the measuring of the directional signal comprises:
measuring, as the directional signal, a signal corresponding to the intensity difference in a directionality where a first intensity measured with respect to the first signal or a second intensity measured with respect to the second signal is less than the intensity difference.

15. The method of claim 13, wherein the measuring of the directional signal comprises:
measuring, as the directional signal, a signal corresponding to a first intensity or a second intensity in a directionality where the first intensity measured with respect to the first signal or the second intensity measured with respect to the second signal is greater than or equal to the intensity difference.

16. The method of claim 12, wherein, when the transmitter is a light irradiator that transmits the first signal and the second signal based on different directionalities, in a form of light, estimating of at least one of the location and the direction of the target object estimates at least one of the location and the direction of the target object based on a first light receiving intensity measured with respect to a first light corresponding to the first signal, a second light receiving intensity measured with respect to a second light corresponding to the second signal, and an intensity difference between the first light receiving intensity and the second light receiving intensity.

17. The method of claim 16, wherein the light irradiator separately emits the first light and the second light based on at least one of a time division scheme, a coding scheme, and an optical wavelength.

18. The method of claim 12, wherein, when the first signal and second signal are in a form of light, the receiving of the first signal and the second signal receives, based on different directionalities, a first light corresponding to the first signal and a second light corresponding to the second signal, or receives, based on the same directionality, the first light and the second light in different receiving directions; and the estimating of at least one of the location and the direction of the target object estimates at least one of the location and the direction of the target object based on at least one of a first light receiving intensity measured with respect to the first light, a second light receiving intensity measured with respect to the second light, and an intensity difference between the first light receiving intensity and the second light receiving intensity.

19. A method of sensing a high precision signal, the method comprising:

separately receiving, as a first light and a second light, a light emitted from a light emitting device at a light receiving device comprising a plurality of light receivers having different directionalities or different receiving directions;

measuring a first light receiving intensity with respect to the first light and a second light receiving intensity with respect to the second light; and estimating at least one of a location or direction of the light emitting device based on at least one of the first light receiving intensity, the second light receiving intensity, and an intensity difference between the first light receiving intensity and the second light receiving intensity.

20. A non-transitory computer-readable storage medium encoded with computer readable code comprising a program for implementing the method of claim 12.

* * * * *